March 25, 1958     J. S. ROBERTS     2,827,860
PISTON LUBRICATOR
Filed Jan. 3, 1956
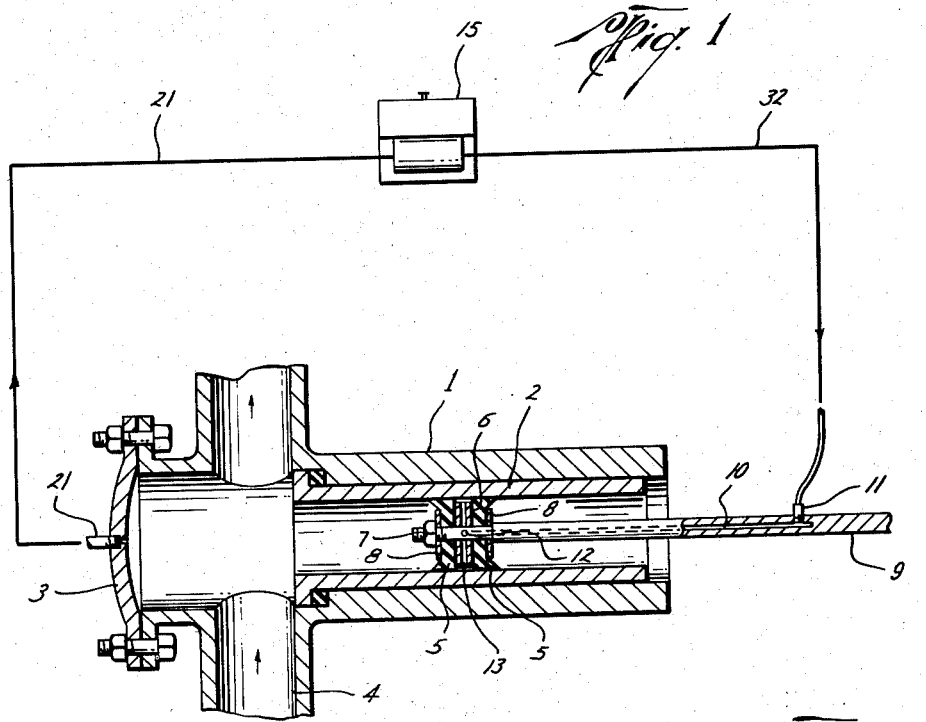
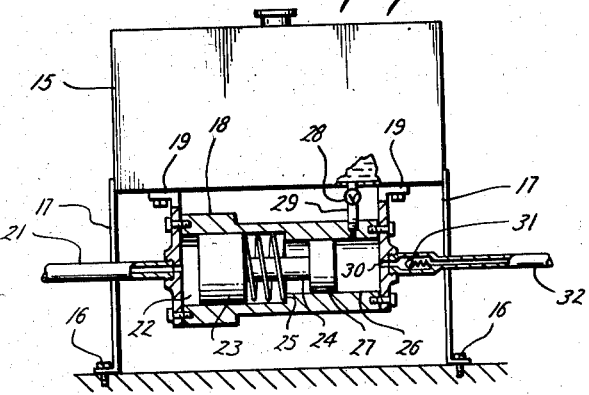
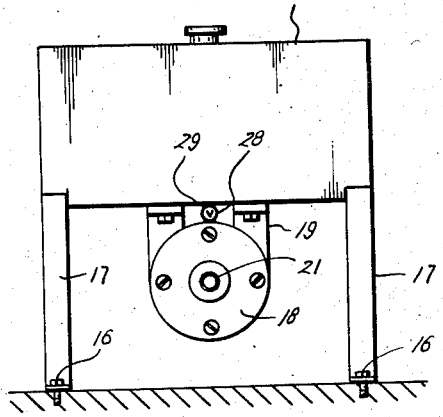
Jack S. Roberts
INVENTOR.
BY Ramsler O. Wyatt
ATTORNEY

United States Patent Office 2,827,860
Patented Mar. 25, 1958

2,827,860

PISTON LUBRICATOR

Jack S. Roberts, Houston, Tex.

Application January 3, 1956, Serial No. 556,899

1 Claim. (Cl. 103—202)

This invention relates to new and useful improvements in a pump piston lubricator.

It is an object of this invention to provide a pump piston lubricator for force feeding a lubricant to the core of a pump piston, such as are used in slush pumps and the like.

It is another object of this invention to provide a pump lubricator having novel means for utilizing the pressure of the flow through the pump to actuate the flow of lubricant to the pump piston to the end that the pressure of the lubricant will always exceed the pressure in the flow line of the pump.

In pumps, such as slush pumps, the piston usually consists of a pair of rubber body members mounted on a piston rod with a metallic core separating them. The disc-like body members fit tightly against the walls of the cylinder and as the piston reciprocates the walls are wiped clean. This usually results in the inside faces of the body members being subjected to constant movement against the dry face of the cylinder, resulting in rapid wear and a breaking down of the inside edges of the body members causing rapid deterioration of the piston and leakage past the body members. It is an object of this invention to provide a means for lubricating the core of the piston so that the cylinder walls will be lubricated as the inside faces of the piston pass over same and that will provide a supply of lubricant constantly to said core at a pressure always slightly greater than the pressure of the flow in the flow line of the pump.

With the above and other objects in view, the invention has relation to certain novel features of construction, operation and arrangement of parts more particularly defined in the following specifications and illustrated in the accompanying drawings, wherein:

Figure 1 is a diagrammatic view of the system, showing the pump piston and cylinder in cross section.

Figure 2 is a side elevational view of the lubricant supply means, in cross section, and Figure 3 is an end view of the lubricant supply means.

Referring now more particularly to the drawings, the numeral 1 designates a pump, such as a slush pump, having the conventional liner 2, head 3 and flow line 4. A piston rod 9 reciprocates in the cylinder formed by the liner 2 and has a piston thereon composed of rubber piston body members 5, 5 and a metal core 6. The piston is anchored to the rod in the usual manner, as by the nut 7 and the plates 8, 8. The piston rod 9 has a passageway 10 leading from the inlet 11, 11 formed preferably by an internally threaded socket in the rod 9, in which a suitable connection fitting is mounted, and terminating in the outlet port 12 which is in alignment with the passageways 13 in the core 6, and which passageways 13 terminate in the peripherial groove 14 in the core 6.

A lubricant tank 15 is mounted in a suitable location on the pump housing, as by the studs 16, 16 and upstanding legs 17, 17 and mounted beneath the tank 15 is the piston housing 18, which may be suspended from the tank 15 as by the arms 19, 19. A tubing 20 extends from the restricted port 21 in the cylinder head 3 of the pump and leads into the cylinder 22 in the housing 18. A piston 23 is mounted on one end of the piston rod 24 in the cylinder 22 and a resilient means, as the coil spring 25, urges the piston 23 against the inlet end of the housing 18. The inside wall of the housing 18 is reduced forming the reduced cylinder 26 and in which the piston 27, which is secured to the rod 24, reciprocates. A valve 28 controls the flow of lubricant from the tank 15 into the cylinder 26 through the conduit 29. An outlet port 30, having a back pressure valve 31 leads out of the cylinder 26 and a conduit 32 extends from the valve 31 to the inlet fitting 11 in the reciprocating piston rod 9.

As the piston rod 9 reciprocates, the pressure in the flow line 4 will be transmitted in pulsations through the conduit 21 to the cylinder 22 where, upon pressure stroke the piston 23 will be moved away from the inlet opening. The amount of lubricant desired may be controlled through the valve 28, so that the preselected amount of lubricant will be admitted into the cylinder 26 and as the piston 23 is moved against the spring 25, the piston 27 will force the lubricant in the cylinder 26 through the conduit 32 into the reciprocating rod passageway 10 and through the passageways 12 and 13 against the cylinder walls of the pump, thus lubricating the inside face of the piston body members 5, 5. The valve 31 will prevent any back pressure through the conduit 32 into the cylinder 26. The return stroke of the piston rod 9 will relieve the pressure on the piston 23 and the suction on the line 15 will assist in returning the pistons 23 and 27 to starting position, to permit another supply of lubricant to flow into the cylinder 26 for discharge through the conduit 32 upon the next pressure stroke of the piston 6.

The pulsations of the pressure in the pump will thus control the force feeding of the lubricant through the conduit 32. The piston 27 being smaller than the piston 23 will apply a slightly greater amount of pressure on the line 32, through which the lubricant is being forced, thus forcing the lubricant against the cylinder wall of the pump regardless of the pressure in the flow line of the pump, and will continue this lubrication even though a leak may develop past the piston body members 5, or either of them.

What I claim is:

In a piston lubricator for pumps having a reciprocating piston rod and piston and a lubricating passageway through said reciprocating rod and piston; a pressure operated means and a source of lubricant supply in operative connection with said pressure operated means and said lubricating passageway, and means for transmitting pressure from the flow line of the pump to said pressure operated means, said pressure operated means having a pressure piston movable in one direction by pressure pulsations from said flow line, and having means constantly urging said pressure piston in the other direction to return said pressure piston to starting position, a circumferentially reduced lubricant moving piston reciprocated by said pressure piston and said source of lubricant supply having a discharge opening directing a flow of lubricant into the path of said lubricant moving piston to be forced through said lubricating passageway.

References Cited in the file of this patent

UNITED STATES PATENTS

| 648,153 | Serve | Apr. 24, 1900 |
| 1,654,673 | Barks | Jan. 3, 1928 |
| 2,430,723 | Lupfer | Nov. 11, 1947 |

FOREIGN PATENTS

| 484,199 | France | Sept. 12, 1917 |